(12) United States Patent
Lopez et al.

(10) Patent No.: US 9,562,153 B2
(45) Date of Patent: Feb. 7, 2017

(54) ENHANCED COMPOSITION BASED ON A HOMOPOLYMER AND/OR POLYPROPYLENE COPOLYMER FOR MANUFACTURING CARBONATED BEVERAGE CAPS

(71) Applicant: INDELPRO, S.A. DE C.V., Monterrey (MX)

(72) Inventors: Victor Manuel Sanchez Lopez, Monterrey (MX); Antonio Mata Martinez, Monterrey (MX)

(73) Assignee: INDELPRO, S.A. DE C.V., Monterrey (MX)

( * ) Notice: Subject to any disclaimer, the term of this patent is extended or adjusted under 35 U.S.C. 154(b) by 0 days.

(21) Appl. No.: 14/794,881

(22) Filed: Jul. 9, 2015

(65) Prior Publication Data

US 2016/0009909 A1    Jan. 14, 2016

(30) Foreign Application Priority Data

Jul. 10, 2014 (MX) .............................. 2014/008464

(51) Int. Cl.

| | | |
|---|---|---|
| *C08L 23/10* | (2006.01) | |
| *C08L 23/12* | (2006.01) | |
| *C08L 23/16* | (2006.01) | |
| *C08L 23/08* | (2006.01) | |

(52) U.S. Cl.
CPC .............. *C08L 23/10* (2013.01); *C08L 23/12* (2013.01); *C08L 2201/04* (2013.01); *C08L 2205/24* (2013.01); *C08L 2207/02* (2013.01)

(58) Field of Classification Search
CPC ... C08L 23/10; C08L 2207/02; C08L 2201/04; C08L 2205/24; C08L 23/12; C08L 23/16

USPC .......................................................... 524/523
See application file for complete search history.

(56) References Cited

FOREIGN PATENT DOCUMENTS

| CN | 101792558 A | * | 8/2010 |
| CN | 102453279 A | * | 5/2012 |
| JP | 2008-19003 A | | 1/2008 |
| JP | 2008019003 A | * | 1/2008 |
| JP | 2010-222032 A | | 7/2010 |
| JP | 2010222032 A | * | 10/2010 |
| KR | 10-2013-0034119 A | | 4/2013 |
| KR | 20130034119 A | * | 4/2013 |
| MX | 2007010929 A | | 10/2008 |

* cited by examiner

*Primary Examiner* — Michael M Bernshteyn
(74) *Attorney, Agent, or Firm* — Hoffmann & Baron, LLP

(57) ABSTRACT

A composition based on a polypropylene homopolymer and/or copolymer for preparing caps for carbonated drinks has enhanced properties of rigidity and leak-tightness without the need for using additional seals. The composition includes: 85.65 to 97.87 parts of a polypropylene homopolymer and/or copolymer; 1.5 to 12 parts of an ethylene-octene and/or ethylene-methyl acrylate elastomer, and an additive selected from 0.3 to 1.2 parts of a lubricating and/or sliding agent; 0.05 to 0.3 parts of a nucleation agent; 0.08 to 0.25 parts of an antioxidant and/or antistatic agent, and 0.2 to 0.6 parts of an antistatic agent. The polypropylene polymer is selected from a polypropylene homopolymer and has an isotacticity greater than 94% and a MFR of 0.5-7 g/10 min, and/or the polypropylene copolymer is selected from a heterophasic copolymer (ethylene-propylene) and has an isotacticity greater than 88% and a MFR of 0.5-7 g/10 min and/or mixtures of same.

14 Claims, No Drawings

ENHANCED COMPOSITION BASED ON A HOMOPOLYMER AND/OR POLYPROPYLENE COPOLYMER FOR MANUFACTURING CARBONATED BEVERAGE CAPS

CROSS-REFERENCE TO RELATED APPLICATIONS

This application claims the benefit of Mexican Application No. MX/a/2014/008464, filed Jul. 10, 2014.

FIELD OF THE INVENTION

The present invention relates to an improved composition based on a polypropylene homopolymer and/or copolymer for manufacturing and/or producing caps for carbonated drinks having enhanced properties of rigidity and leak-tightness without the need for using additional seals made of poly(ethylene-vinyl acetate) (EVA) polymers or other polymers such as polyethylene polymers and to the method for the manufacture thereof, in particular for the use thereof in the industry of carbonated drinks and soft drinks and/or with any type of container that requires a cap.

BACKGROUND OF THE INVENTION

The present invention relates to an improved composition based on a polypropylene homopolymer and/or copolymer for manufacturing and/or producing caps for carbonated drinks having enhanced properties of rigidity and leak-tightness without the need for using additional seals made of poly(ethylene-vinyl acetate) (EVA) polymers or other polymers such as polyethylene polymers and to the method for the manufacture thereof, in particular for the use thereof in the industry of carbonated drinks and soft drinks and/or with any type of container that requires a cap.

Currently, caps without seal made of polypropylene or polyethylene are used only for capping bottles for water with satisfactory results given that they have no leaks; however, these types of caps without polypropylene and/or polyethylene type seal (liner) cannot be used with carbonated products due to the carbon dioxide gas that has been added to the soft drinks; this is because the cap does not resist the pressure of the pressurized liquid inside the vessel; in order to solve this problem, the improved composition according to the invention includes: a polypropylene homopolymer and/or copolymer; an ethylene-octene and/or ethylene-methyl acrylate elastomer, and an additive selected from a lubricating or sliding agent, a nucleation agent, an antioxidant, an antistatic agent and/or a mixture of same; it provides the flexibility necessary to give the cap the softness, rigidity (strength) and leak-tightness so that the pressure does not overcome the cap causing the loss of carbon dioxide gas that has been added to the sodas.

Currently, polyethylene and polypropylene caps are also known that are provided with a type of seal (liner) for capping bottles of carbonated drinks and/or sodas; however, the associated process is more expensive, since it involves the use of two materials, one for the cap and the other for the seal, in addition to integrating the seal with the cap. This represents a problem as it increases the production costs.

Polyethylene caps are also known that do not have a type of seal (liner) for capping bottles of carbonated drinks and/or sodas; however, to prevent leaks, the design of the shape of the internal flange of the cap and the cap itself had to be greatly changed; satisfactory results have been obtained with this modification in preventing leaks, but unfortunately the production time for each one the caps has increased; as it is, the improved composition of the present invention solves this problem as well, as it results in the obtention of caps without seals and is associated with an increase in the production thereof.

The improved composition of the present invention also solves this problem as it results in the obtention of caps without seals. The seals that have already been used are of the poly(ethylene-vinyl acetate) (EVA) type (liner); upon elimination of the seal from the caps, the caps now are cleaner since they are made of a single material.

The document KR20130034119 (Abstract) describes a PAC type medical container with draw off ring (cap) for reducing the product defects and for facilitating the use by maintaining the openability with less change in the force it takes to open it after high-temperature sterilization. The cap-type ring is manufactured according to the following process steps: —injection molding of 40-60% by weight of polypropylene and 40-60% by weight of elastomer, and sterilization at 121 degrees Celsius or higher. It has a percentage of change (%) of the openability before and after the sterilization process that satisfies the following equation 1: Os1=openability of the cap before the sterilization process (kgf). Os2=openability of the cap after the sterilization process (kgf). However, this composition is different from the composition of the present invention, and in addition, the product obtained (cap) has different properties of use, and as a result it is not detrimental to novelty or inventive step.

The document CN102453279 (Abstract) relates to a polypropylene composition for the production of a bottle cap for a carbonated drink. The composition includes the following substances: 30-60 parts of a polypropylene homopolymer with an isotacticity greater than 99% and a MFR of 1-30 g/10 min; 30-60 parts of the block of a polypropylene copolymer with a MFR of 1-15 g/10 min; 4-20 parts of polyethylene with a density of 0.955-0.968 g/cm$^3$ and a MFR of 1-15 g/10 min; 5-15 parts of polyolefin elastomer; 0.05-0.2 parts of nucleation agent, and 0.3 to 1 part of sliding agent. The product has excellent rigidity and a satisfactory resistance to impact and stress. However, this composition is different from the composition of the present invention, since the percentages of each one of the components are different and, in addition, it includes 4-20 parts of polyethylene with a density of 0.955-0.968 g/cm$^3$ and a MFR of 1-15 g/10 min; this document also mentions that if all the components are not in the composition, the resulting product has unsatisfactory properties (comparative Examples 1, 2 and 3); the product obtained (cap) using this composition has different properties of use from the cap of the present invention, and as a result it is not detrimental to novelty or inventive step.

The document CN101792558 refers to an internal cap material for transfusion bags and to a method for preparing and applications of same. The preparation method includes the following steps: uniformly mixing 30-70 parts of polypropylene, 0-30 parts of polyethylene, 10-40 parts of elastomer, 2-8 parts of flow modifier and 0.5-2 parts of antioxidant, adding while mixing in an extruder at 130-180° C. at the speed of 30-70 rpm; extrusion at the speed of 200-500 rpm; cooling with water, drying, granulation so as to obtain the internal cap material for transfusion bags, wherein the melting index of the internal cap material at 190° C. and under the pressure of 2016 g is 5-15 g/10 min. The internal cap material has the advantage of high tenacity and a satisfactory radiation tolerance. The internal cap material for transfusion bags can be processed by injection molding directly for preparing the internal stoppers for transfusion bags. The yellowing index of the internal cap subjected to radiation with respect to 25 kg using gamma rays is less than or equal to 10, and the rate of rupture of the transfusion cap kit after perforation with a transfusion contact pin can be less than or equal to 2%. However, this composition is different from the composition of the present invention, since the percentages of each one of the components are different, and in addition the product obtained has different properties of use, and as a result it is not detrimental to novelty or inventive step.

The document JP2010222032 relates to a cap lining, which allows retort processing and is characterized by gas barrier properties, sealing capacity or similar properties, and is used to produce a cap and a capped bottle. The liner of the cap 5 provided within the cap 1 and the seal of the mouth of the bottle are formed by polypropylene resin and the hydrogenation of rubber made of a conjugated diene styrene block copolymer, that is to say a polystyrene elastomer obtained by kneading styrene styrene-ethylene-butylene or ethylene styrene-propylene styrene with a MFR of 0.01 g/10 min (200 [degree] C. 5 kg) or lower and polybutene with a viscosity of 40-280 mm$^2$/S at 100° C. The cap lining contains 10 to 65% by weight of polybutene. However, this composition is different from the composition of the present invention, since the percentages of each one of the components are different, and in addition the product obtained has different properties of use, and as a result it is not detrimental to novelty or inventive step.

The document JP2008019003 relates to a polypropylene stopper that does not result in whitening including when the cap is made from a colored polypropylene that includes a dye (except for white), and having performances including moldability, workability, opening pluggability, resistance to impact, or similar properties. The polypropylene stopper is made from a resin composition which includes 70-95% by weight of a homopolypropylene and 5 to 30% by weight of a modifier consisting of a polyolefin-based elastomer and has a bending modulus of 800 to 2000. However, this composition is different from the composition of the present invention, since the percentages of each one of the components are different, and in addition the product obtained has different properties of use, and as a result it is not detrimental to novelty or inventive step.

The document MX2007010929 relates to vulcanized thermoplastics cured with peroxide, which include a thermoplastic (polypropylene) and an isomonoolefin-multiolefin elastomer such as butylene rubber. More particularly, the invention relates to vulcanized thermoplastics cured with peroxide, in which the elastomer includes at least 3.5 mol % of a multiolefin for the purpose of facilitating the curing with peroxide. The vulcanized thermoplastics according to the present invention are useful in the preparation of molded articles for applications requiring high purity, such as condensor caps, medical components and fuel cell components. However, this composition is different from the composition of the present invention, since the percentages of each one of the components are different, and in addition the product obtained has different properties of use, and as a result it is not detrimental to novelty or inventive step.

DESCRIPTION OF THE INVENTION

The present invention relates to an improved composition based on a polypropylene homopolymer and/or copolymer for producing caps for carbonated drinks having enhanced properties of rigidity and leak-tightness without the need for using additional seals made of poly(ethylene-vinyl acetate) (EVA) polymers or other polymers such as polyethylene polymers and to the method for the manufacture thereof, in particular for the use thereof in the industry of carbonated drinks and soft drinks and/or with any type of container that requires a cap.

In a first form of the present invention, the improved composition for producing caps for carbonated drinks having enhanced properties of rigidity and leak-tightness includes:

a) 85.65 to 97.87 parts of a polypropylene homopolymer and/or copolymer, in which the polypropylene homopolymer has an isotacticity greater than 94% and a MFR of 0.5-7 g/10 min, and the polypropylene copolymer is selected from a heterophasic copolymer (ethylene-propylene) and has an isotacticity greater than 88% and a MFR of 0.5-7 g/10 min;

b) 1.5 to 12 parts of an ethylene-octene and/or ethylene-methyl acrylate elastomer, and c) an additive selected from 0.3 to 1.2 parts of a lubricating and/or sliding agent; 0.05 to 0.3 parts of nucleation agent; 0.08 to 0.25 parts of an antioxidant and/or antistatic agent, and 0.2 to 0.6 parts of an antistatic agent.

In the composition of the present invention, the homopolymer and the copolymer can be used alone and/or mixed, resulting in the obtention of caps with excellent enhanced properties of rigidity and leak-tightness in both cases. The ratio when the homopolymer is mixed with a copolymer is from 1:1 to 3:1 and/or from 1:1 to 1:3 parts.

The elastomer is selected from an ethylene-octene elastomer, from an ethylene-methyl acrylate elastomer and/or mixtures of same. The ratio when the elastomers are mixed is from 1:1 to 2:1 and/or from 1:1 to 1:2 parts.

In a second form of the present invention, the improved composition for producing caps for carbonated drinks having enhanced properties of rigidity and leak-tightness includes:

a) 85 to 98 parts of a polypropylene homopolymer and/or copolymer;

b) 1.5 to 12 parts of an ethylene-octene and/or ethylene-methyl acrylate elastomer, and c) 0.5 to 3 parts of an additive selected from a lubricating or sliding agent, a nucleation agent, an antioxidant, an antistatic agent and/or mixtures of same.

In addition, the composition of the present invention may or may not include a dye (blue, green, red, yellow, white), as desired; such dyes are known by the person skilled in the art and therefore need not be mentioned in detail, although it is preferable to use food-grade dyes.

The lubricating and/or sliding agent can be selected from the compounds of starches, stearates, glycerols such as glycerol monostearate, cis-13-docosenoamide and compounds having the numbers CAS 112-84-5 (e.g., 13-docosenoamide), CAS 31566-31-1 (e.g., glycerol monostearate) and/or mixtures of these compounds.

The nucleation agent can be selected from the compounds of sodium benzoate, 2,2-methylene-bis-4,6-di-tert-butylphenyl lithiophosphate, 1,3:2,4-bis(3,4-dimethylbenzylidene) sorbitol, magnesium silicate talc and compounds having the numbers CAS 532-32-1 (e.g., sodium benzoate), CAS 85209-93-4 (e.g., 12H-Dibenzo[d,g][1,3,2]dioxaphosphocin, 2,4,8,10-tetrakis(1,1-dimethylethyl)-6-hydroxy-, 6-oxide, lithium salt), CAS 135861-56-2 (e.g., MILLAD 3988i), HPN-20E (e.g., Cyclohexanedicarboxylic acid, calcium salt (1:1), (1R,2S)-rel/Zinc Stearate), HPN-600EI, CAS 14807-96-6 and/or mixtures of these compounds.

The antioxidant agent and/or an antistatic agent can be selected from the phenol antioxidant compounds such as tetrakis[methylene-3(3',5'-di-tert-butyl-4'-hydroxyphenyl) propionate]methane, tris(2,4-di-tert-butylphenyl) phosphite, 1,3,5-trimethyl-2,4,6-tris(3,5-di-tert-buty-4-hydroxybenzyl) benzene, compounds with the numbers CAS 6683-19-8 (e.g., Pentaerythritol tetrakis[3-(3,5-di-tert-butyl-4-hydroxyphenyl)propionate]), CAS 31570-04-4 (e.g., tris(2,4-di-tert-butylphenyl) phosphite), CAS 1709-70-2 (e.g., 1,3, 5-trimethyl-2,4,6-tris(3,5-di-tert-buty-4-hydroxybenzyl) benzene) and/or mixtures of these compounds.

The antistatic agent can be selected from the mono- and/or diglyceride compounds with a $C_{14}$ to $C_{18}$ carbon atom chain, and/or glycerides having the number CAS 67701-33-1 (e.g., Mono- and Diglycerides) and/or mixtures of these compounds.

With the improved composition according to the present invention, it is possible to manufacture and/or produce caps for capping bottles of carbonated drinks, non-carbonated drinks and soft drinks, having enhanced properties of rigidity and leak-tightness, which prevents the gas from leaking and the loss of rigidity and leak-tightness of the cap on the bottle.

The characteristic of the cap obtained when using the improved composition of the present invention is that it confers a balance between rigidity and leak-tightness, and this makes it possible to not use a seal on the caps and yet to guarantee the leak-tightness of same. The seals no longer used are of the poly(ethylene-vinyl acetate) (EVA) type (liner), and after eliminating the seal from the caps, the caps are cleaner since they are made of a single material.

In addition, the improved composition of the present invention makes it possible to manufacture and/or produce polypropylene caps without a type of seal (liner).

The polypropylene or polyethylene caps without seal (liner) are used only for capping bottles for water with satisfactory results since they have no leaks; however, the polypropylene and polyethylene caps without a type of seal (liner) cannot be used with carbonated products due to the carbon dioxide gas content that has been added to the soft drinks; because the cap does not resist the pressure of the pressurized liquid inside the vessel and therefore leaking of gas and also liquid occurs.

In addition, for polypropylene or polyethylene caps without seal (liner) that are used for carbonated products in order to prevent leaks, the design of the shape of the internal flange of the cap and the cap itself had to be greatly changed; satisfactory results have been obtained with this modification in preventing leaks, but unfortunately the production time for each one the caps has increased; as it is, the improved composition of the present invention solves this problem as well, as it results in the obtention of caps without seals and is associated with an increase in the production thereof.

Now, in order to solve this entire problem, the improved composition of the present invention includes an elastomer which provides the flexibility necessary to give the cap the softness, rigidity (strength) and leak-tightness so that the pressure does not overcome the cap causing the loss of carbon dioxide gas that has been added to the sodas. The improved composition of the present invention is also used to manufacture and/or produce caps for capping bottles of carbonated water, mineral water and/or any cola or flavored soft drink.

The particular combination of all the components in the proportions indicated in the improved composition of the present invention is the one that makes it possible to produce caps with the characteristics that gives them a balance between rigidity and leak-tightness for their use in bottles with carbonated or sparkling drinks.

The caps in their interior have a design with a part in the form of a flange that makes it leak-tight; both in the inner diameter as well as the outer diameter of the bottle and the cap form a perfect seal thus preventing leaks and guaranteeing its leak-tightness.

When using the improved composition of the present invention, it is possible to manufacture and/or produce the caps, by means of an injection process, such as by means of a continuous compression molding (CCM) process, in any injection machine and/or compression molding machine; these processes being known to the person skilled in the art so that it is therefore not necessary to mention them in detail.

In a first form of the present invention, the improved composition is used for manufacturing caps by means of the injection process; this process is carried out by means of a mold with (n) cavities which remains closed due to the compression system of the injection device; this prevents the mold from opening when the improved molten composition enters, and once the mold is filled with material, the part cools for a while and then said parts are expelled by a mold ejection system in order to obtain the final part.

If the improved composition is used for manufacturing caps by means of the continuous compression molding (CCM) process, which as its name indicates is continuous as it comprises a rotating carousel in which the (n) cavities are located, and in each cavity a dose of the hot improved composition is deposited, which is pressed by a male part (bolt) with the shape of a thread by means of cams and pressure, the hot material is pressed to the shape of the part (cap).

EXAMPLES

The following examples are intended to illustrate the invention in a nonlimiting manner; any variation from said examples is considered to fall within the scope of the present invention.

Example 1

A cap is manufactured by the injection method using the following composition: a) 85.65 to 97.87 parts of a polypropylene homopolymer and/or copolymer in which the polypropylene homopolymer has an isotacticity of more than 94% and a MFR of 0.5-7 g/10 min, and the polypropylene copolymer is selected from a heterophasic copolymer (ethylene-propylene) and has an isotacticity of more than 88% and a MFR of 0.5-7 g/10 min; b) 1.5 to 12 parts of an ethylene-octene and/or ethylene-methyl acrylate elastomer, and c) an additive selected from 0.3 to 1.2 parts of a lubricating and/or sliding agent; 0.05 to 0.3 parts of nucleation agent; 0.08 to 0.25 parts of an antioxidant and/or an antistatic agent and 0.2 to 0.6 parts of an antistatic agent.

The caps obtained with the composition have a satisfactory bending modulus, a satisfactory resistance to wear, rigidity and leak-tightness, which makes it possible to use them for capping carbonated drinks such as soft drinks without any gas or liquid leak occurring.

Example 2

A cap is manufactured according to the method of the previous example, using a composition which includes: includes: a) 85 to 98 parts of a polypropylene homopolymer and of a polypropylene copolymer; b) 1.5 to 12 parts of an ethylene-octene and/or ethylene-methyl acrylate elastomer, and c) 0.5 to 3 parts of an additive selected from a lubricating or sliding agent, a nucleation agent, an antioxidant, an antistatic agent and/or mixtures of same. In this composition, the ratio of the polypropylene homopolymer to polypropylene copolymer is 1:1 to 3:1 and/or from 1:1 to 1:3 parts.

The caps obtained with the composition have a satisfactory bending modulus, a satisfactory resistance to wear, rigidity and leak-tightness, which makes it possible to use them for capping carbonated drinks such as soft drinks and also non-carbonated drinks without any gas or liquid leak occurring.

Example 3

A cap is manufactured according to the method of the previous example, using a composition which includes: includes: a) 85 to 98 parts of a polypropylene homopolymer and/or copolymer; b) 1.5 to 12 parts of an ethylene-octene elastomer and an ethylene-methyl acrylate elastomer, and c) 0.5 to 3 parts of an additive selected from a lubricating or sliding agent, a nucleation agent, an antioxidant, an antistatic agent and/or mixtures of same.

In this composition, the ratio of ethylene-octene elastomer to ethylene-methyl acrylate elastomer is from 1:1 to 2:1 and/or from 1:1 to 1:2 parts.

The caps obtained with the composition have a satisfactory bending modulus, a satisfactory resistance to wear, rigidity and leak-tightness, which makes it possible to use them for capping carbonated drinks such as soft drinks and also non-carbonated drinks without any gas leak or liquid leak occurring.

Example 4

The rigidity and leak-tightness of the caps of the preceding examples are evaluated compared to polypropylene and polyethylene caps provided with a seal (liner) and without seal (liner) by way of the detection of leaks in sparkling carbonated using a leak detector DP400 (which is a complete instrument allowing one to measure the pressure in order to detect leaks, which makes it possible to measure with high precision the changes in pressure for leak detection: precision: +/−1 Pa), for the purpose of which the different caps are placed in the apparatus, and an evaluation is carried out to determine whether or not there is a leak, which resulted in the obtention of the following results.

TABLE 1

| CAPS | Leak | Leak-tightness and rigidity |
|---|---|---|
| Example 1 | No | Excellent |
| Example 2 | No | Excellent |
| Example 3 | No | Excellent |
| With | | |
| polypropylene seal | No | Satisfactory |
| polyethylene seal | No | Satisfactory |
| Without | | |
| polypropylene seal | Yes | Unsatisfactory |
| polyethylene seal | Yes | Unsatisfactory |
| polyethylene seal (modified cap design) | No | Satisfactory |

CONCLUSIONS

The caps of Examples 1 to 3 have no leaks and they have a satisfactory leak-tightness in spite of the fact that they do not have a type of seal (liner) similar to the caps with polypropylene and polyethylene seal (liner), and for that reason the caps manufactured with the composition according to the invention can be used to cap carbonated drinks such as soft drinks without the need for a seal, which makes them cleaner, less costly and allows an increase in the production thereof.

And, moreover, the polypropylene and polyethylene caps that have no type of seal (liner) have leaks and are therefore are not suitable for capping carbonated drinks. However, in order to prevent leaks, the design of the shape of the internal flange of the cap and the cap itself had to be greatly changed; satisfactory results have been obtained with this modification in preventing leaks, but unfortunately the production time for each one the caps has increased; as it is, the improved composition of the present invention solves this problem as well, as it results in the obtention of caps without seals and is associated with an increase in the production thereof.

Advantages

1. With the improved composition it is possible to produce caps for carbonated drinks that have enhanced properties of rigidity and leak-tightness which prevent gas and liquid leaks.

2. The composition includes: a polypropylene homopolymer and/or copolymer; an ethylene-octene and/or ethylene-methyl acrylate elastomer, and an additive selected from a lubricating or sliding agent, a nucleation agent, an antioxidant, an antistatic agent and/or mixtures of same.

3. The improved composition of the present invention makes it possible to manufacture and/or produce polypropylene caps instead of producing polyethylene and polypropylene caps with seal.

4. With the improved composition according to the present invention, it is possible to manufacture and/or produce caps for capping bottles of sparkling carbonated drinks, non-carbonated drinks and soft drinks, which have enhanced properties of rigidity and leak-tightness, which prevents gas leaks and loss of the rigidity and leak-tightness of the cap on the bottle.

5. With the improved composition of the present invention, caps are obtained without any type of seals (liner) with an increase in the production thereof.

CHARACTERISTICS i) The characteristic of the cap obtained when using the improved composition of the present invention is that it confers a balance between rigidity and leak-tightness, which makes it possible not to use a seal in the cap in order to guarantee the leak-tightness of same. The seals no longer used are of the polyethylene vinyl acetate (EVA) type (liner); upon elimination of the seal from the caps, the caps are cleaner since they are made of a single material.

ii) When using the improved composition of the present invention, it is possible to manufacture and/or produce the caps, by means of the injection process, such as by means of the continuous compression molding (CCM) process, in any injection machine and/or any compression molding machine.

It must be observed that in relation with this fact, the best method known by the applicant for implementing the cited invention is the one that results clearly from the present description of the invention.

The invention claimed is:

1. A composition for producing caps for carbonated drinks having enhanced properties of rigidity and leak-tightness, comprising:
   a) 85 to 98 parts of a polypropylene homopolymer and/or copolymer;
   b) 1.5 to 12 parts of an ethylene-octene and/or ethylene-methyl acrylate elastomer, and
   c) 0.5 to 3 parts of an additive selected from the group consisting of a lubricating or sliding agent, a nucleation agent, an antioxidant, an antistatic agent and combinations thereof.

2. The composition according to claim 1, wherein the composition includes:
   a) 85.65 to 97.87 parts of a polypropylene homopolymer and/or copolymer, in which the polypropylene homopolymer has an isotacticity greater than 94% and a MFR of 0.5-7 g/10 min, and the polypropylene copolymer is selected from a heterophasic copolymer (ethylene-propylene) and has an isotacticity greater than 88% and a MFR of 0.5-7 g/10 min;
   b) 1.5 to 12 parts of an ethylene-octene and/or ethylene-methyl acrylate elastomer, and
   c) an additive selected from 0.3 to 1.2 parts of a lubricating and/or sliding agent; 0.05 to 0.3 parts of a nucleation agent; 0.08 to 0.25 parts of an antioxidant and/or an antistatic agent, and 0.2 to 0.6 parts of an antistatic agent.

3. The composition according to claim 1, wherein, when the elastomers are mixed, the ratio is from 1:1 to 2:1 and/or from 1:1 to 1:2 parts.

4. The composition according to claim 1, wherein, when the homopolymer and the copolymer are mixed, the ratio is from 1:1 to 3:1 and from 1:1 to 1:3 parts.

5. The composition according to claim 1, further comprising a dye.

6. The composition according to claim 1, wherein the lubricating and/or sliding agent is selected from the group consisting of starches, stearates, glycerols and combinations thereof.

7. The composition according to claim 1, wherein the nucleation agent is selected from the group consisting of sodium benzoate; 2,2-methylene-bis-4,6-di-tert-butylphenyl lithiophosphate; 1,3:2,4-bis(3,4-dimethylbenzylidene)sorbitol; magnesium silicate talc and combinations thereof.

8. The composition according to claim 1, wherein the antioxidant and/or an antistatic agent is a phenol antioxidant compound.

9. The composition according to claim 1, wherein the antistatic agent is selected from the group consisting of mono- and/or diglyceride compounds with a $C_{14}$ to $C_{18}$ carbon atom chain.

10. The composition according to claim 1, wherein the composition has enhanced properties of rigidity and leak-tightness, without the need for using additional poly(ethylene-vinyl acetate) (EVA) polymers or polyethylene polymers.

11. The composition of claim 5, wherein the dye is selected from the group consisting of a blue dye, a green dye, a red dye, a yellow dye, a white dye and combinations thereof.

12. The composition of claim 5, wherein the dye is a food grade dye.

13. The composition of claim 6, wherein the glycerols are selected from the group consisting of glycerol monostearate, cis-13-docosenoamide and combinations thereof.

14. The composition of claim 8, wherein the phenol antioxidant compound is selected from the group consisting of tetrakis[methylene-3(3',5'-di-tert-butyl-4'-hydroxyphenyl)propionate] methane; tris(2,4-di-tert-butylphenyl) phosphite; 1,3,5-trimethyl-2,4,6-tris(3,5-di-tert-buty-4-hydroxybenzyl)benzene and combinations thereof.

\* \* \* \* \*